United States Patent
Neri-Badillo

(10) Patent No.: US 9,175,979 B2
(45) Date of Patent: Nov. 3, 2015

(54) PREPAYMENT SYSTEM FOR SUPPLYING WATER OR GAS BY MEANS OF A WIRELESS INTELLIGENT CARD AND METER FOR SAID SYSTEM

(75) Inventor: Eduardo Agustín Neri-Badillo, Estado de México (MX)

(73) Assignee: Sistemas Integrales de Medicion y Control Stellum S.A. de C.V., Federal District (MX)

( * ) Notice: Subject to any disclaimer, the term of this patent is extended or adjusted under 35 U.S.C. 154(b) by 240 days.

(21) Appl. No.: 13/003,633

(22) PCT Filed: Aug. 28, 2008

(86) PCT No.: PCT/MX2008/000114
§ 371 (c)(1),
(2), (4) Date: Apr. 14, 2011

(87) PCT Pub. No.: WO2010/008265
PCT Pub. Date: Jan. 21, 2010

(65) Prior Publication Data
US 2012/0101910 A1  Apr. 26, 2012

(30) Foreign Application Priority Data

Jul. 14, 2008  (MX) .................... MX/a/2008/009100

(51) Int. Cl.
*G01F 15/00* (2006.01)
*G06Q 20/00* (2012.01)
*G01D 4/00* (2006.01)
*G06Q 20/20* (2012.01)

(52) U.S. Cl.
CPC ............... *G01D 4/00* (2013.01); *G06Q 20/206* (2013.01); *Y02B 90/246* (2013.01); *Y04S 20/42* (2013.01)

(58) Field of Classification Search
None
See application file for complete search history.

(56) References Cited

U.S. PATENT DOCUMENTS

| | | | | |
|---|---|---|---|---|
| 2,196,425 A | * | 4/1940 | Nuebling | 137/513 |
| 4,253,341 A | * | 3/1981 | Ikeda et al. | 73/861.77 |
| 4,357,601 A | * | 11/1982 | McWilliams | 340/506 |
| 4,571,691 A | * | 2/1986 | Kennon | 340/545.3 |
| 4,795,892 A | * | 1/1989 | Gilmore et al. | 235/381 |
| 4,940,976 A | * | 7/1990 | Gastouniotis et al. | 340/870.02 |
| 5,146,067 A | * | 9/1992 | Sloan et al. | 235/381 |
| 5,261,275 A | * | 11/1993 | Davis | 73/258 |
| 5,546,801 A | * | 8/1996 | Swinson et al. | 73/273 |
| 5,824,896 A | * | 10/1998 | Lee | 73/238 |

(Continued)

FOREIGN PATENT DOCUMENTS

| | | | | | |
|---|---|---|---|---|---|
| EP | 950991 A2 | * | 10/1999 | | G07F 7/00 |
| EP | 1400933 A1 | * | 3/2004 | | G07F 15/00 |

(Continued)

OTHER PUBLICATIONS

Water Hammer and Air in Pipes, http://www.irrigationtutorials.com/waterhammer.htm.*

(Continued)

*Primary Examiner* — Ig T An
*Assistant Examiner* — Michael Maicher
(74) *Attorney, Agent, or Firm* — Ladas & Parry LLP

(57) ABSTRACT

A prepayment system for supplying water or gas by means of a wireless intelligent card is described. The present invention also relates to a bidirectional meter specially designed to electronically record the consumption of water or gas.

6 Claims, 5 Drawing Sheets

(56) References Cited

U.S. PATENT DOCUMENTS

| | | | |
|---|---|---|---|
| 6,012,339 A * | 1/2000 | Genack et al. | 73/861.77 |
| 6,035,725 A * | 3/2000 | Spendel et al. | 73/861 |
| 6,054,930 A * | 4/2000 | Guillon | 340/637 |
| 6,351,223 B1 * | 2/2002 | DeWeerd et al. | 340/870.03 |
| 6,529,883 B1 * | 3/2003 | Yee et al. | 705/63 |
| 6,581,458 B1 * | 6/2003 | Hathaway et al. | 73/238 |
| 6,648,175 B2 * | 11/2003 | Struthers et al. | 222/71 |
| 7,994,927 B2 * | 8/2011 | Atassi | 340/609 |
| 2006/0278269 A1 * | 12/2006 | McGill | 137/38 |
| 2007/0227593 A1 * | 10/2007 | Belford et al. | 137/202 |

FOREIGN PATENT DOCUMENTS

| | | | |
|---|---|---|---|
| EP | 1811451 A2 * | 7/2007 | G06Q 30/00 |
| WO | 2006/041276 A2 | 4/2006 | |

OTHER PUBLICATIONS

International Preliminary Report on Patentability for corresponding Application No. PCT/MX2008/000114.

* cited by examiner

PREPAYMENT SYSTEM FOR SUPPLYING WATER OR GAS BY MEANS OF A WIRELESS INTELLIGENT CARD AND METER FOR SAID SYSTEM

FIELD OF THE INVENTION

This invention refers to a prepayment system for supplying water or gas meters and, more particularly, to an efficient method and system that controls the supply of water or gas, getting at the same time significant information of the meter by means of wireless intelligent cards. This invention is also related to a meter with the purpose of measuring the gas or water consumption electronically.

BACKGROUND OF THE INVENTION

So far the water and gas utilility companies have carried out the consumption reading of such services at the user's place, so they later can bill the corresponding service used by the consumer. However, new technological systems have been proposed lately, such as a prepayment supplying system for electricity, water or gas, as a way to overcome some of the disadvantages traditional billing systems have.

A kind of prepayment system was designed in order to purchase the electricity, water or gas supply directly from the central station. The information about the amount purchased is then transferred to a measuring device installed at the client's place (for instance, his store, establishment, office, home, etc.), where the service is used. The system receives the information about the prepayment and transfers the amount acquired at the central station. The measuring device usually consists of a mechanical meter located outside the client's place. It generally includes an interface or terminal placed adjacent to the meter, it reads the prepayment information or, alternatively, such interface is connected by means of a cable, or by means of the same cables of the water or gas supplying system, to the meter in case the latter is located inside the client's place. A disadvantage these prepayment systems have is that they need specific devices which are expensive and difficult to install. Another problem is their lack of capability to send back to the central station the information about the consumption, the way the credit is used, which meter is using such credit, as well as information concerning unlawful use of the meter. This kind of systems is known as unidirectional communication system.

Another kind of prepayment system known is also based on purchasing the water or gas service directly from the central station or other previously assigned stations. The information about the amount purchased is stored in a magnetic stripe card or in contact smart cards (hereafter called "contact card"). This particular prepayment system needs, by all means, the mechanical gas or water meter to have an external card reader or a magnetic key and a series of additional control devices that monitor the m$^3$ of water or gas supply. The card reader device has a slot into which the contact card is inserted in order to transfer the information of the prepayment service. Examples of this system are disclosed in FR 2 777 677, EP 0 863 492, CN 1952613, 1952617, CN 2257636, CN 2444211 CN 2565000, CN 2727862, CN 2784887, CN 2837796, and WO 99/42963.

Nonetheless, there is a large disadvantage in this kind of prepayment card reader meters. The reader device must be accessible from the outside in order for the prepayment cards to be inserted. This makes it vulnerable to damage (voluntary or involuntary) by the user, by saline environment or by relatively high humidity. When the contact card is frequently used, its magnetic stripe or its chip may wear out causing the card and the transfer of information difficult to be read. Another problem occurs when the contact card reader is connected to the meter by means of a cable, due to such cable is also exposed to damage. There have been attempts to integrate the reader into the meter. The problem is that the meter has to undergo important design changes which apart from increasing its size, they make it more vulnerable to damage by being partly exposed to the environment and by making it incompatible with the connectors existing in the market nowadays.

Other kind of prepayment systems that control the water and gas supply are the ones that include some devices that cut off the supply by being automatically activated when the credit has run out.

Most of the water or gas meters used in the prepayment systems include mechanical elements that register the consumption of such services. This kind of meters use a mechanical register composed of a gear train that measures the m$^3$, liters and tenths of liters of water or gas. The disadvantage with this kind of meters is that they are exposed to unlawful acts due to the fact that they can register the circulating flow in one way. However, if the meter registering mechanism is inverted, it will start to circulate backwards to register a decrease in the consumption in terms of the last reading.

Another fault in the prepayment meters previously described, particularly in water meters, lies in the fact that the mechanical elements that register the water service do not stand the water hammer produced by the high pressure generated when the water supply is provided in a controlled and scheduled way. The water hammer ends up damaging such mechanical elements. There is yet another disadvantage in this kind of meter under the circumstances of controlled and scheduled water supply, the mechanical elements that register the consumption will be activated by the air trapped and led through the pipes starting to deduct the water consumption from the prepaid amount at the moment the air circulates through such meter elements.

Having the above-mentioned faults into account, the object of this invention is to provide a prepayment system that controls more efficiently the water or gas supply by means of a meter installed in the client's place based on the prepaid service amount.

Another object of the present invention is to provide a prepayment measuring system concerning the prepaid water or gas consumption in m$^3$ using a hermetically closed integrated meter along with a wireless intelligent card. Another object of the present invention is to provide a prepayment water or gas consumption measuring system that integrates an automatic device to interrupt the water or gas supply.

Another object of the present invention is to provide a prepayment system for measuring the prepaid water or gas consumption in m$^3$ and which by means of a wireless intelligent card provides the supplier of the service with information about the consumption, about how the credit is used, where or which meter is using the credit and also information about unlawful acts and manipulation done to the meter.

One more object of the present invention is to provide a prepayment method for the m$^3$ water or gas supply by means of a system consisting of a wireless card-reader.

Another object of the present invention is to provide a meter that includes electronic means that register the consumption in a bidirectional system regardless of how the meter is connected.

Another object of the present invention is to provide a prepayment system and a meter including means that detect and release the air trapped in the pipes and the air that circulates through the meter. Such means release the air that circulates in the water pipes and the one that reaches the meter, preventing this air from being registered as water flow that does not circulate in the meter.

SUMMARY OF THE INVENTION

This invention refers to a one-piece meter which integrates a more efficient prepayment system and method to control the water or gas supply previously purchased. Simultaneously it gets significant information about the meter by means of wireless intelligent cards.

The wireless prepayment system includes a meter, which in turn, includes electronic means that register the water or gas bidirectional consumption, a wireless electronic measuring device, prepayment control and a supply cut mechanism which detects and validates a prepayment wireless intelligent card. This mechanism also controls the prepayment system and supplies the meter with water or gas. Such wireless electronic measuring, prepayment and water or gas supply device also includes a wireless intelligent card reader-writer element, a microcontroller, a controller that monitors the supply interruption, and a feed source (battery). This prepayment system searches for the wireless intelligent card in order to get the supply of water or gas in $m^3$. This operation takes place only on few occasions so as not to spend much energy. On one embodiment of this invention the water or gas meter includes a button to start the process of search for the wireless card and to transfer the prepaid amount from such card into the meter. This process has the purpose of having a larger energy saving and increasing the lifespan of the battery.

The water or gas prepayment method by using a prepayment wireless intelligent card and a water or gas meter with an internal wireless intelligent card reader-writer element follows the steps of exchanging information between the meter and the prepayment wireless intelligent card by means of a radio frequency method, simultaneously it authenticates the card and the internal card reader-writer as well as the meter serial number, then it deducts and stores the credit in the prepayment wireless intelligent card in the meter memory, it records the information about the meter state in the prepayment wireless intelligent card.

The electronic-means meter that registers the bidirectional water or gas consumption is hermetically sealed, so it does not need to have a slot to operate the wireless card. The meter is composed of a main body, an upper and a lower cover, a measuring chamber as well as a supply and closing chamber set in fluid communication inside the meter's main body; a wireless electronic measuring, prepayment and supply cut device, a primary sensor that registers the water or gas consumption—It is a hall-effect sensor that detects the amount of $m^3$ circulating through the measuring chamber—, a device that transforms the magnetic signal into a digital signal,—this converter is coupled with the primary sensors—, as well as secondary safety sensors that detect the opening of any of the covers. In the event a cover, upper or lower, gets unhooked from the meter's body, the meter will stop its function until a technician from the utility company re-establishes it. The meter has a bidirectional system, that is, it always accumulates the consumption in a positive way regardless of the way it is connected.

BRIEF DESCRIPTION OF THE DRAWINGS

The elements considered special features of this invention will be mentioned in detail in the claims herein enclosed. However, the invention per se—its organization and the way it operates—together with other objects and advantages it has, will be better understood in the description of certain embodiments. The following figures and numbers will help relate the different parts of the invention, in which similar reference numbers identify identical elements, where:

DETAILED DESCRIPTION OF THE INVENTION

Figure 1:
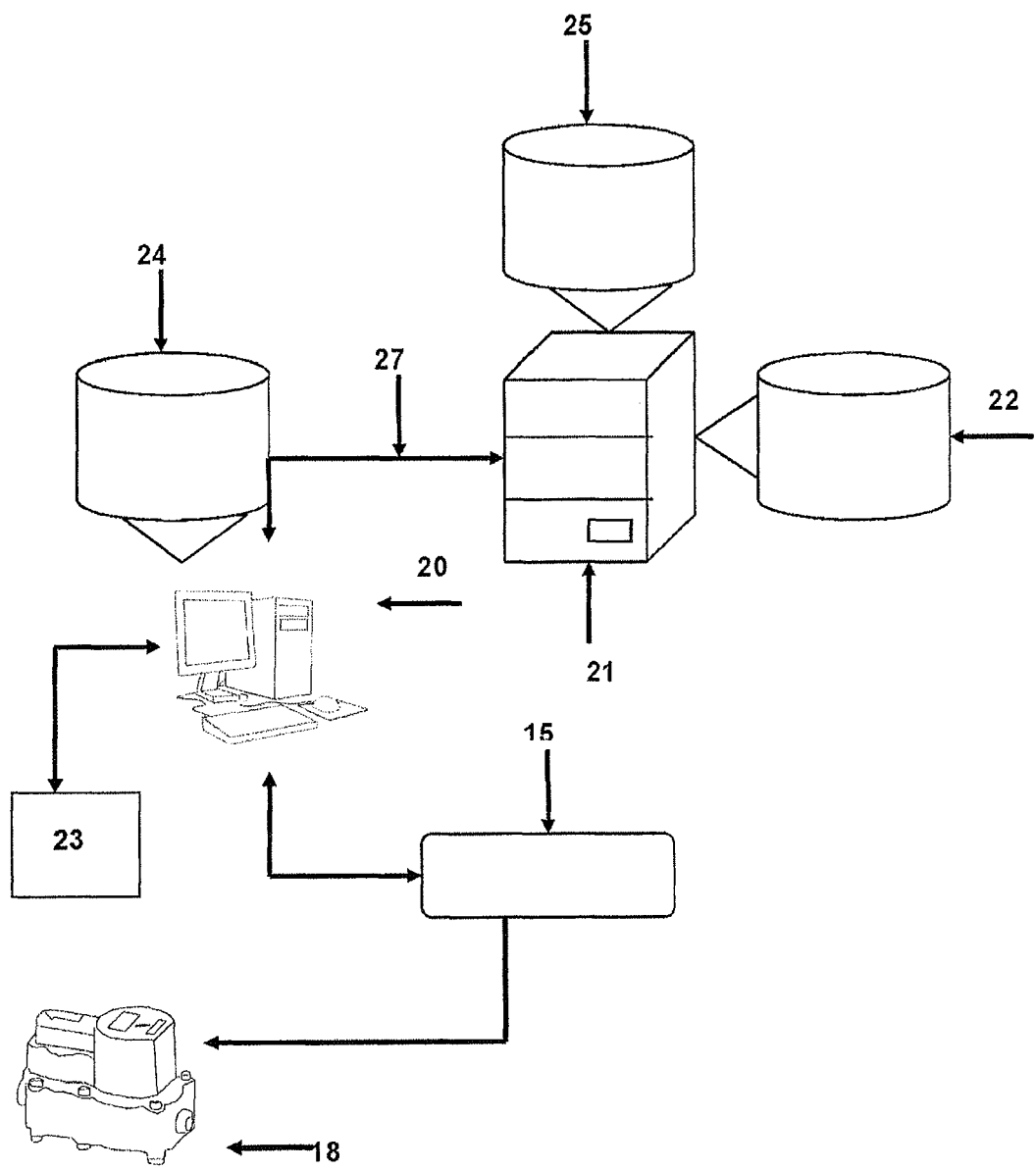
FIG. 1 is a simplified diagram that illustrates the prepayment system for measuring water or gas in accordance with a preferred embodiment of this invention.

The term "Wireless or No-contact Card", as it is used on the present invention, refers to the exchange of a signal between a prepayment intelligent card and a wireless reader-writer element without using galvanic elements (that is, the absence of an ohmic contact on the reader-writer device) towards the integrated circuit inserted in the wireless card, and where the power that makes such circuit work is taken from the signal generated by the wireless reader-writer element. The communication and power towards such integrated circuits takes place by means of an inductive coupling. A wireless or no-contact card does not have to be attached to the wireless reader-writer element. A non-constant distance varying from some millimeters to some centimeters is enough to have information transmission between them.

The term "Intelligent Card", as it is used on the present invention, refers to a card with a similar size of a plastic credit one. It has an integrated circuit (a microprocessor, a memory or a device similar to a memory), and a reader with a processing power that can be used for various applications under great safety conditions.

The terms "Digital Signature" or "Digital Key", as they are used on the present invention, refer to a sequence of data by means of which a signal coded with the same sequence of data can be decoded.

The term "unlawful", as it is used on the present invention, refers to all the activity done with the purpose of altering the register of the water or gas consumption used by the customer.

The term "Anti-collision", as it is used on the present invention, is related to a kind of method of deciding which card to use. Depending on the card serial number, only one is chosen. This process is stated in ISO 14443-3A and ISO14443-4A standards.

The term "controlled and scheduled water supply", as it is used on the present invention, refers to the water supplied at certain hours and to the specific amount in cubic meters, or both.

The term "meter", as it is used on the present invention, refers to a meter that registers the water or gas consumption electronically, and which controls the opening or closing of the prepayment system supply valve.

The present invention provides a wireless or no contact prepayment system and method for registering and measuring the water or gas consumption by means of a data communication system and where the meter and the wireless prepayment system are completely integrated in one piece hermetically protected against water and air and has no contact with the environment. The wireless prepayment system and method for measuring water or gas consumption lowers installation and function costs by offering an integral meter that enables a wireless data communication to both the user's meter and the water or gas service supplier without using additional and complex data transmission equipment. Furthermore, the wireless data communication takes place by means of a wireless reader-writer element integrated into a wireless electronic measuring, prepayment and water or gas cut device placed inside the meter, where the intelligent card sends the meter the information of the purchased amount directly and in a wireless way. At the same time, it uploads and stores information about variations in the meter functioning. In the event of a water prepayment supply and, particularly, of a controlled and scheduled water supply, it displays information about the controlled supply schedules. This water or gas wireless prepayment system allows the payment of such service before its consumption by means of a wireless intelligent card. The intelligent wireless card is loaded with: i) funds at a point of sale terminal or directly at the water or gas supplier's office; and, when it applies, schedule information in case there is a controlled and scheduled water supply.

On the present invention, the customer receives water or gas supply from the utility company directly to their meter and without the need of connecting the meter to any terminal or communication interface or any other external device that is used as a link (e.g. infrared link, direct cable connection, RF link or any communication by means of a CA line) to control the water or gas supply.

FIG. 1 shows a simplified diagram of the wireless prepayment system for measuring water and gas consumption in accordance with a preferred embodiment of the present invention. As shown in FIG. 1, the wireless prepayment system for measuring water and gas consumption includes preferably at least one point of sale terminal 20 that can be located at the central station and/or at payment offices assigned by the supplier. At least one point of sale 20 is equipped with a wireless intelligent card reader-writer device 23, which can be chosen from any intelligent card reader-writer commercially available. Point of sale terminal 20 has at the same time a communication interface 27 to connect, by means of a server 21, into the payment system located at the central station or at the supplier's office, which keeps real time information about the customers' accounts and the data stored in supplier's data base 22. Typically, the means of communication used by interface 27 can be, for instance, via a MODEM using the Internet or an intranet, or via a link specific to this purpose. Data base 22 will store the prepaid $m^3$ amount of water or gas purchased by the user, updated information on the schedule when there is a controlled water supply, the total amount of the $m^3$ of water or gas measured during the lifespan of the meter, information about the battery, unauthorized manipulation and unlawful use by the customer so that the utility company can analyze it and take any necessary actions.

With the purpose of providing safe communication between point of sale terminal 20 and server 21, including transmission validation—data reception, the wireless prepayment system for measuring $m^3$ water or gas consumption will include at least a pair of safety modules 24 and 25 which, as shown in FIG. 1, are installed in both server 21 and points of sale 20. Preferably, safety modules 24 and 25 provide encrypting and decrypting functions for data transmission between server 21 and point of sale terminal 20, for instance, by means of digital keys where data can be decrypted only with the use of such digital keys, so when data is transmitted from the point of sale terminal to the server and vice versa, even if the transmission is intercepted, this data cannot be decoded if the decrypting keys are not available. Data transmitted between point of sale 20 and prepayment wireless intelligent card 15 is encrypted by safety module 24 by means of digital keys written on intelligent cards 15. Safety module 24 also provides data security for all the transactions carried by wireless intelligent card 15 and intelligent cards reader-writer module 23. Preferably, wireless intelligent card 15 and meter 18 include encrypting/decrypting means respectively, installed in their own microcontroller to perform the encrypted information exchange function. On a particularly preferred embodiment, the encrypting means of meter 18 is located in the wireless electronic measuring, prepayment and water or gas supply cut device, or it can alternatively be placed in the intelligent wireless reader-writer element.

At the moment of hiring or renewing the water or gas service, the utility company will install a meter 18 with the prepayment system of this invention at the user's place and will hand in a reusable wireless intelligent card 15 which has been previously loaded with certain amount of prepaid $m^3$ of water or gas at point of sale 20. In case of controlled and scheduled water supply, the company will also include information concerning the time when the water supply meter valve should be opened or closed each day and/or the $m^3$ amount to supply per day. On a preferred embodiment, the prepayment wireless intelligent card 15 will be personalized with information that will be stored in the memory of its microcontroller. Such information will be chosen from the group, consisting of the meter number, the contract number, the date the card was last loaded, safety keys (for instance, digital signatures, such as the ones specified in the Mifare© encrypting system [where, on the preferred embodiment, a key A will be used to download a certain prepaid $m^3$ amount of water or gas, and a B key will be used to upload and download certain $m^3$ amount of prepaid water or gas in a sector of the card], or a triple encrypting DES system, etc.), as well as information about the prepaid $m^3$ amount of water or gas, the prepaid $m^3$ amount of water or gas to be transferred to the meter by downloading method. On a particularly preferred embodiment, the memory of the prepayment wireless intelligent card microcontroller is able to receive and store information generated by the meter 18 concerning the $m^3$ of water or gas used by the customer during the lifespan of the meter, as well as tampering and unlawful actions done to the meter.

To start information download about the prepaid amount of water or gas, the user will reach meter 18 with prepayment wireless intelligent card 15 and the reader-writer means will initially search and validate the prepayment card 15 with the purpose of later downloading totally or partially the prepaid $m^3$ amount. In case of controlled and scheduled supply, the times when meter 18 valve will open and close to supply water will be downloaded too. Whether the download of prepaid $m^3$ from card 15 to meter 18 is total or partial will depend on the value recorded on the safety keys in the wireless intelligent card concerning the prepaid $m^3$ amount of water and gas that is possible to transfer to the meter by downloading method, or when credit is less than the discharge value. On an alternate embodiment of this invention, meter 18 will include a button to activate the wireless reader-writer element and in this way to be able to download the $m^3$ from the intelligent card. In this invention the term 'prepaid $m^3$ amount of water or gas that will be transferred by downloading method refers to the amount of $m^3$ that will be totally downloaded in the meter. At the same time or after downloading the prepaid $m^3$ amount of water or gas, wireless reader-writer element of meter 18 will transfer all the information generated by the meter concerning the water or gas used by the customer during the lifespan of the meter, unlawful actions and the battery state to the wireless intelligent card, and that information will then be recorded in the microcontroller memory of such card.

Meter 18 will display on its screen information about the remaining prepaid m³ amount of water or gas supply so that the user can go to a point of sale terminal 20 to download the wireless intelligent card 15 with money. Point of sale terminal 20 accepts, reads and writes from and to a prepayment wireless intelligent card 15 used for the prepayment system for measuring water or gas as it is requested by the supplier program. As mentioned before, the wireless intelligent card is downloaded at a point of sale terminal 20, but data collected from card 15 about meter 18 is also downloaded in order to be sent to data base 22 for revision by the water or gas utility company. Point of sale terminal 20 accepts payments in both pesos (or any other local currency) and m³ of water or gas, and sends this transaction back to server 21 of service supplier in order to be stored in data base 22. Nonetheless, as such information is recorded in prepayment wireless intelligent card 15 it will always be in m³ so that the customer can download the prepaid m³ amount of water or gas in meter 18. Therefore, the meter screen will always display such information in m³.

Figure 2:
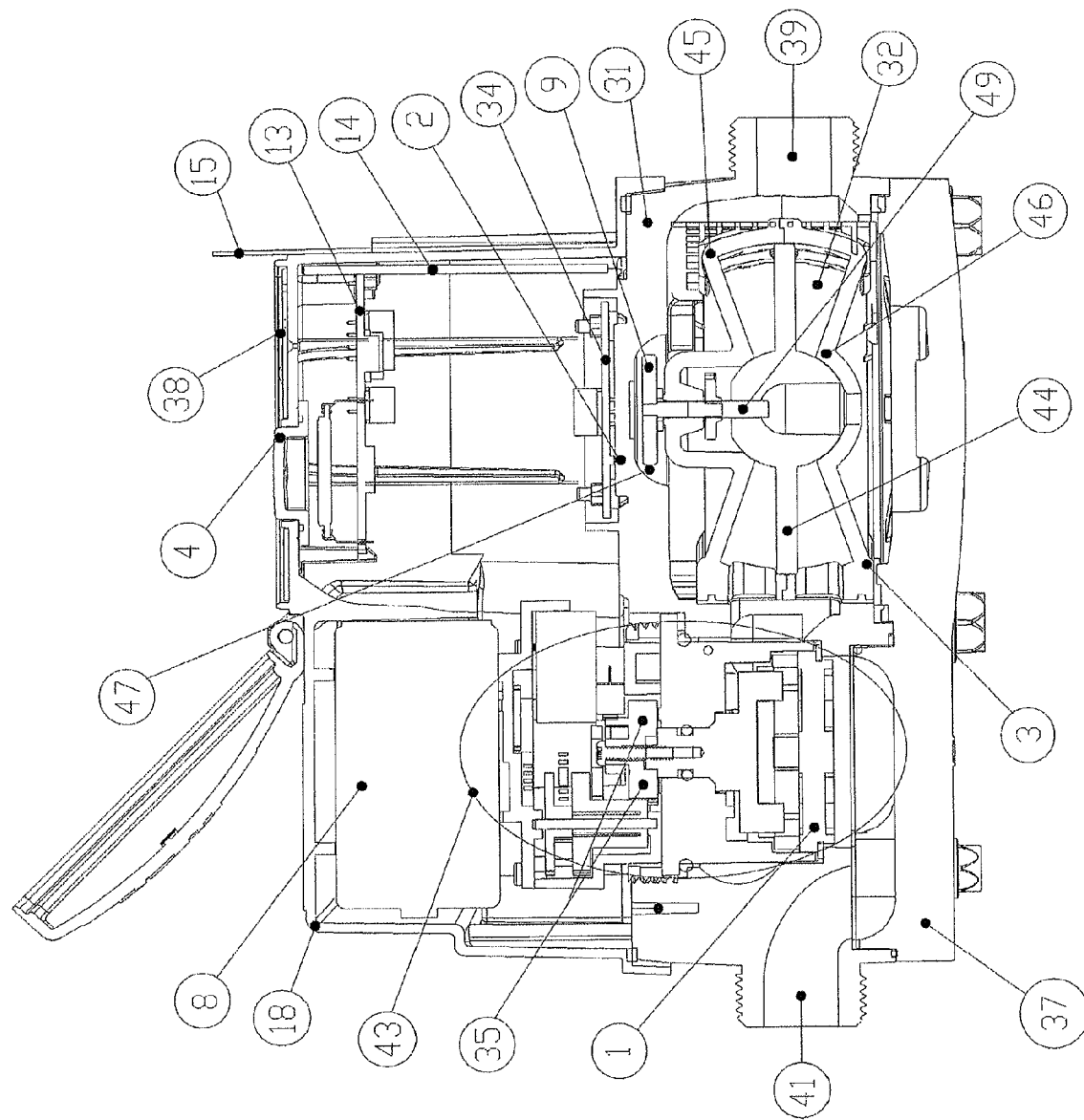
FIG. 2 is a longitudinal cross-sectional view of the meter of the present invention.

Meter 18 is shown in FIG. 2 along with electronic means that register the bidirectional consumption of water or gas of the present invention. Meter 18 consists of main body 31, lower protective cover 37, upper protective cover 38, entrance or feed hole for water or gas 39, exit or supply hole for water or gas 41, a wireless electronic measuring prepayment and water or gas supply cut 13 placed inside upper protective cover 38; means to register bidirectional water or gas consumption placed inside upper protective cover 38 and connected to the wireless electronic measuring prepayment and water or gas supply cut 13, a closing/opening mechanism for supplying water or gas 1, an antenna 14, and a liquid crystal display placed on the upper protective cover 38.

Main body 31 of meter 18 has two cavities that house one measuring chamber 32 and a supply-cut chamber in fluid communication. Preferably, measuring chamber 32 is a volume measuring chamber, but it can alternatively be a velocity measuring chamber. Measuring chamber 32 includes electronic means to measure the bidirectional consumption of water or gas, where the electronic means, in order to register the bidirectional consumption, consist of nutating disc 44 and upper and lower protective covers 45, 46 which enclose nutating disc 44 to keep it in position and to ensure its correct measuring movement. Upper cover 45 which encloses nutating disc 44 also has a hole that runs through it. Furthermore, the cavity that houses measuring chamber 32 shows a reduced central portion 47 that will house magnetic element 9. Measuring chamber 32 has also a rod 49 that couples on its external side with magnetic element 9 and which runs downwards through the hole of upper cover 44 to couple also on its internal side with nutating disc 44 where water that flows through the entrance hole 39 of main body 31 of meter 18 enters measuring chamber 32 making nutating disc 44 spin and thus transmit its rotating movement to magnetic element 9 through rod 49.

As shown in FIG. 2, the external surfaces of main body 31 are protected by upper and lower protective covers 37, 38. A first sensor element 2 is located on the adjacent external surface of measuring chamber 32 of the meter's main body and within the upper protective cover. The first sensor element 2 registers the circular movement of magnetic element 9 transmitted by nutating disc 44 where first sensor element 2 (for instance a hall-effect sensor) detects the number of spins of magnetic element 9 in order to later calculate the volume of m³ flowing through measuring chamber 32. Preferably, the first sensor element 9 is connected to a magnetic-signal-to-digital-signal converter device which receives the magnetic signal from magnetic element 9 transmitted by nutating disc 44 to turn into digital signal.

Particularly, the first sensor element 2 will detect magnetic element 9 spin regardless of the fact that direction of water or gas supply flowing through the meter has been reversed in order to get a reduction in the register of water or gas consumption. That is, when the meter is uninstalled to place the exit hole or water or gas supply 41 of such meter as the entrance or feed hole of water or gas. First sensor element 2 will always register the spin because of the magnet different polarities to then turn them into digital signals which in turn are used to calculate the volume that flows through measuring chamber 32. Therefore, meter 18 has the capability of measuring the water flow in any direction it circulates; hence, it has a bidirectional characteristic. Typically, upper protective cover 38 includes a liquid crystal display 4 that shows the customer's information.

As mentioned before, upper protective cover 38 also houses inside a wireless electronic measuring, prepayment, and water or gas supply cut device 13 which is electrically coupled with the mechanic device in digital signal coupled with first sensor element to change the magnetic signal to digital signal 34 where the wireless electronic measuring prepayment and water or gas supply cut device receives the digital signal and then sends it to liquid crystal display 4 to visualize it.

The supply and closing chamber 43 consists of a closing mechanism 1 composed of a gear train, a sliding disc and a fixed disc placed in such a way to open or close the water or gas supply. The opening or closing gear train is operated by an engine, which is controlled by the wireless electronic measuring, prepayment and water or gas supply cut device that is electrically connected to such engine. While working, the gear train of mechanism 1 of the supply and closing chamber 43 is activated by an engine that is in turn fed by wireless electronic measuring, prepayment and water or gas supply cut device 13, the gear train increases strength to be able to move one sliding disc over a fixed disc that has openings distributed in such way that in one position it closes the water flow and at 90 degree turn the opening coincides to let water circulate. The closing mechanism 1 also includes a pair of sensors 35 which are connected and send the position signal of the disc to wireless electronic measuring, prepayment and water or gas supply cut device.

Meter 18 also has a battery 8 located above the supply and closing chamber, this battery supplies energy to wireless electronic measuring, prepayment and water or gas supply cut device 13 to the electronic means to register the bidirectional water or gas consumption, to the engine that activates the closing mechanism and to the liquid crystal display.

The water that circulates through entrance hole 39 of meter 18 of main body 31 enters measuring chamber 32. This water circulation will make nutating disc 44 (or the blades in case of a velocity chamber) of measuring chamber 32 spin making magnetic element 9 spin as well, transmitting this action to first sensor element 2, which is electrically connected to a magnetic-signal-to-digital-signal converter device 34, and where converter 34 will transmit the digital signal to a microcontroller (not shown) of wireless electronic measuring, prepayment and water or gas supply cut device 13, which will register how many cubic meters circulate through meter 18. Then the water circulates through closing mechanism 1 of supply and closing chamber 43, which can be found open or closed depending on the instruction given by the microcontroller. In the event the latter is open, the water will circulate to the user.

Preferably, meter 18 of the present invention includes second safety sensor elements 3 in order to register the opening of any of protective upper or lower covers 37, 38. Second safety sensor elements 3 are connected to wireless electronic measuring, prepayment and water or gas supply cut device 13. In the event any of upper or lower chambers 37, 38 of meter 18 gets unhooked from main body 31 of the meter, wireless electronic measuring, prepayment and water or gas supply cut device 13 of the meter will send a signal to activate closing mechanism 1 of supply and closing chamber 43 to stop working automatically until a technician from the service company re-establishes it. The meter has a bidirectional system, that is, it always accumulates the consumption in a positive way regardless of the way it is connected.

As regards controlled and scheduled water supply, meter 18 will include and additional sensor element to detect the water flow through the feed line. This water flow sensor element is connected to wireless electronic measuring, prepayment and water or gas supply cut device 13 with the purpose of receiving a signal from the sensor element (not shown) in order to detect the water flow. In the event the water flow is not detected (that is, there is air in the feed line), wireless electronic measuring, prepayment and water or gas supply cut device 13 will send a signal to open a relief valve (not shown) to release the air trapped in the pipes and which could have circulated through the meter and be registered as consumption.

Figure 3:
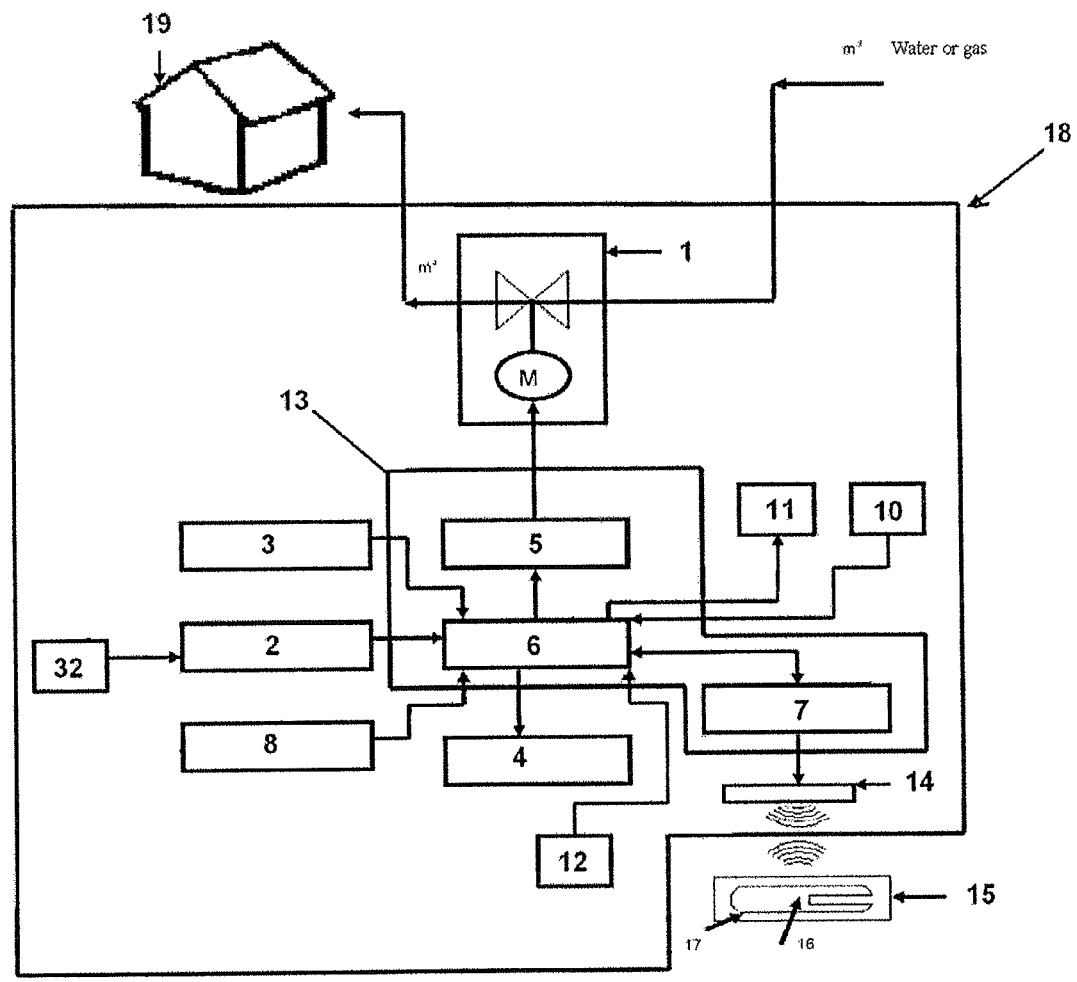
FIG. 3 is a functional and simplified block diagram of a prepayment system integrated into a meter in accordance with a preferred embodiment of the present invention

FIG. 3 shows a functional simplified block diagram of a water or gas meter that integrates the wireless prepayment system which monitors the supply in $m^3$ and gets significant information about such meter, and which is the appropriate one to be used in accordance with a preferred embodiment of the present invention.

In measuring chamber 32 the amount of water that flows through meter 18 is registered and it is transferred by means of a magnetic sensor element 2 to a magnetic-signal-to-digital-signal converter which records and transforms the nutating disc spins inside measuring chamber 32, regardless of the spin direction due to the fact that magnetic sensor element 2 only registers the magnet polarity which will go in the direction the water or gas goes. Wireless electronic measuring, prepayment and water or gas supply cut device 13 receives the signal from the magnetic-signal-to-digital-signal converter and processes such signal by means of a microcontroller 6, which calculates the number of cycles to transform them into a water or gas $m^3$ volume being later shown on liquid crystal display 4. This volume is also recorded in a non-volatile memory of microcontroller 6. Such microcontroller 6 of the wireless electronic measuring, prepayment and water or gas supply cut device receives power supply from a battery 8.

The microcontroller 6 of the wireless electronic measuring, prepayment and water or gas supply cut device 13 also receives a signal from second sensor elements 3 (e.g, magnetic sensors) in order to detect whether any of the meter's covers has been removed.

On an alternative embodiment particularly related to water measuring, microcontroller 6 of wireless electronic measuring, prepayment and water or gas supply cut device 13 receives a signal from an additional sensor element 10 to detect the water flow. In the event the water flow is not detected, microcontroller 6 would activate relief valve 11 to release the air trapped in the pipes.

As mentioned before, wireless electronic measuring, prepayment and water or gas supply cut device 13 includes a microcontroller 6, a wireless reader-writer device 7 and a supply interruption device controller 5. Microcontroller 6 displays, among other functions, information about the $m^3$ amount of water or gas previously prepaid and available for the user, as well as the time when this prepaid water or gas amount can be downloaded from a wireless card 15, along with information about the state of battery 8.

Wireless reader-writer element 7 is responsible for detecting a prepaid card 15 to then send a valid card signal to microcontroller 6 and start monitoring the wireless prepayment system and the water or gas $m^3$ supply to the meter. Generally wireless reader-writer element 7 is activated periodically under instructions by microcontroller 6. On an alternative embodiment, microcontroller 6 will activate wireless reader-writer element 7 by means of a signal sent by a button 12 located on the upper cover of meter 18 in order to start the information transference between wireless intelligent card 15 and prepayment meter 18.

Intelligent card wireless reader-writer element 7 of wireless prepayment system of the present invention transfers, on a first embodiment, the information about prepayment wireless intelligent card 15 into a microcontroller 6. On a second embodiment, intelligent card wireless reader-writer element 7 will transfer the information about microcontroller 6 from meter 18 into intelligent card 15. Communication about the information between wireless intelligent card 15 and meter 18 takes place via a printed circuit board antenna 17 and a memory inserted in prepayment wireless card 16, being both sensitive to the radio frequency band through which it is transmitted. Preferably, wireless card reader-writer element 7 is an integrated circuit that detects the presence of a prepayment wireless card, interprets the commands of such card and creates and sends a radio frequency power signal. Antenna 14 also receives the changes in the radio frequency power signal sent, respecting the protocol of radio frequency data transmission stated by ISO 14443-3A standard, and by ISO 14443-4A standard, or even by any other protocol regarding radio frequency data transmission appropriate for such purpose.

Wireless card reader-writer element 7 generates and sends a radio frequency power signal via antenna 14 of meter 18. The change in the radio frequency power signal sensed by antenna 14 is caused by the presence of a prepayment wireless intelligent card 15. At detecting the presence of a prepayment card 15, wireless card reader-writer element 7 reads and transfers the prepaid amount in $m^3$ from the prepayment wireless card 15 into the microcontroller 6 after following a verification and validation of card 15 by means of an encryption/decryption module of such wireless card reader-writer 7. That is, such encryption/decryption module verifies and validates by means of digital signatures the information recorded in the microcontroller 6 memory, such as the contract number, meter number, date when card was last loaded, safety keys, information about prepaid $m^3$ amount of water or gas, prepaid $m^3$ amount to be transferred into the meter under downloading method, etc. If this information is not verified and validated, the reader will not transfer the prepayment information or the $m^3$ amount from card 15 to meter 18. As for prepayment water supply, and more particularly, controlled and scheduled water supply, information about the time when water is supplied is displayed.

Once prepayment wireless card 15 is verified and validated, data on the prepaid $m^3$ amount of water or gas is transferred from the wireless intelligent card 15 into microcontroller 6 via wireless reader-writer element 7, where microcontroller 6 has the function of deducting the $m^3$ amount of water or gas depending on the user's consumption. Information on the prepaid $m^3$ amount is usually stored in the Flash memory of microcontroller 6 which controls the amount deduction from the prepaid water or gas supply as the user is consuming each m$^3$.

Alternatively, relevant information on historical data about the meter, which is transmitted from the latter and will be recorded on prepayment wireless intelligent card 15, is also stored in memory Flash of microcontroller 6. Therefore, the information exchange between meter 18 and intelligent card 15 is particularly carried out by microcontroller 6 via wireless reader-writer element 7.

On an alternative embodiment of the present invention, the wireless prepayment system for water or gas meters using a wireless intelligent card includes automatic water or gas supply cut mechanism 1 to user 19. FIG. 3 specifically refers to the wireless electronic measuring, prepayment control and water or gas supply cut device 13 and to a controller 5 which monitors a water or gas cut/re-establishment supply 1. On a preferred embodiment of the present invention, microcontroller 6 knows how many water or gas m$^3$ the user still has available. Thus, microcontroller 6 will monitor user 19's water or gas supply or supply cut.

Typically, the user 19 water or gas supply cut will take place when the available water or gas amount stored in the memory of wireless electronic measuring, prepayment control and water or gas supply cut device 13 of meter 18, which is read by microcontroller 6, is equivalent to zero. Water or gas supply will be restored when the available water or gas amount stored in meter's memory 18, read by microcontroller 6, is greater than zero. Microcontroller 6 of wireless electronic measuring, prepayment control and water or gas supply cut device 13 will, at all times, read the m$^3$ amount available.

Water or gas supply cut/re-establishment is provided by means of a controller 5 of wireless electronic measuring, prepayment control and water or gas supply cut device 13 which sends a signal to supply cut/re-establishment mechanism 1, composed of a gear train, a sliding disc and a fixed disc set up especially to open or close the water or gas supply and in which supply cut/re-establishment mechanism 1 can be, on a preferred embodiment, a valve operated by an engine that activates a gear train and the sliding disc over the fixed disc at the same time, having openings distributed in such way that under a certain position the water flow is closed and at 90 degree turn the opening coincides to let the water that opens or closes the water or gas supply circulate. The water or gas supply can be cut off via controller of engine 5, which has the function of opening or closing valve 1 when microcontroller 6 gives the instruction to either open or close the supply via a closing/opening signal which in turn supplies with electric power the engine that activates such valve. Controller 5 opens or closes by means of a solid-state device. When microcontroller 6 reads that the m$^3$ amount stored in the non-volatile memory is equivalent to zero, it will first verify the valve state by means of sensors 35 installed in closing mechanism 1 so as to know whether the valve is open or closed. Then it will send an interrupt signal to control 5, if appropriate.

On an alternative embodiment of the present invention, wireless prepayment system for water or gas meters can be configured by means of wireless intelligent card 15 in such way that meter 18 can open or close at a certain time of the day by using an internal timer to activate the opening/closing controller 5 at the moment pre-set on closing mechanism 1.

As previously mentioned, intelligent card 15 will be reusable and specific to each meter, that is, it must not be used on more than one water or gas meter. Such prepayment wireless intelligent card includes a microcontroller 16 and an antenna 17. The personalized information on the card is recorded in microcontroller 16 internal memory. Preferably, the intelligent card is the, size of a conventional credit card and can follow ISO 14443-1, 14443-2, 14443-3, 14443-4 standards, though these requirements are not mandatory. Likewise, the use of prepayment wireless intelligent cards on a prepayment m$^3$ supply system for water or gas meters of the present invention has two main functions: 1) transferring the prepaid m$^3$ amount of water or gas into the meter; 2) receiving in the wireless card information on water or gas m$^3$ consumed during the lifespan of the meter without the need of hiring a technician or getting sophisticated and costly systems to read the meter.

Figure 4:
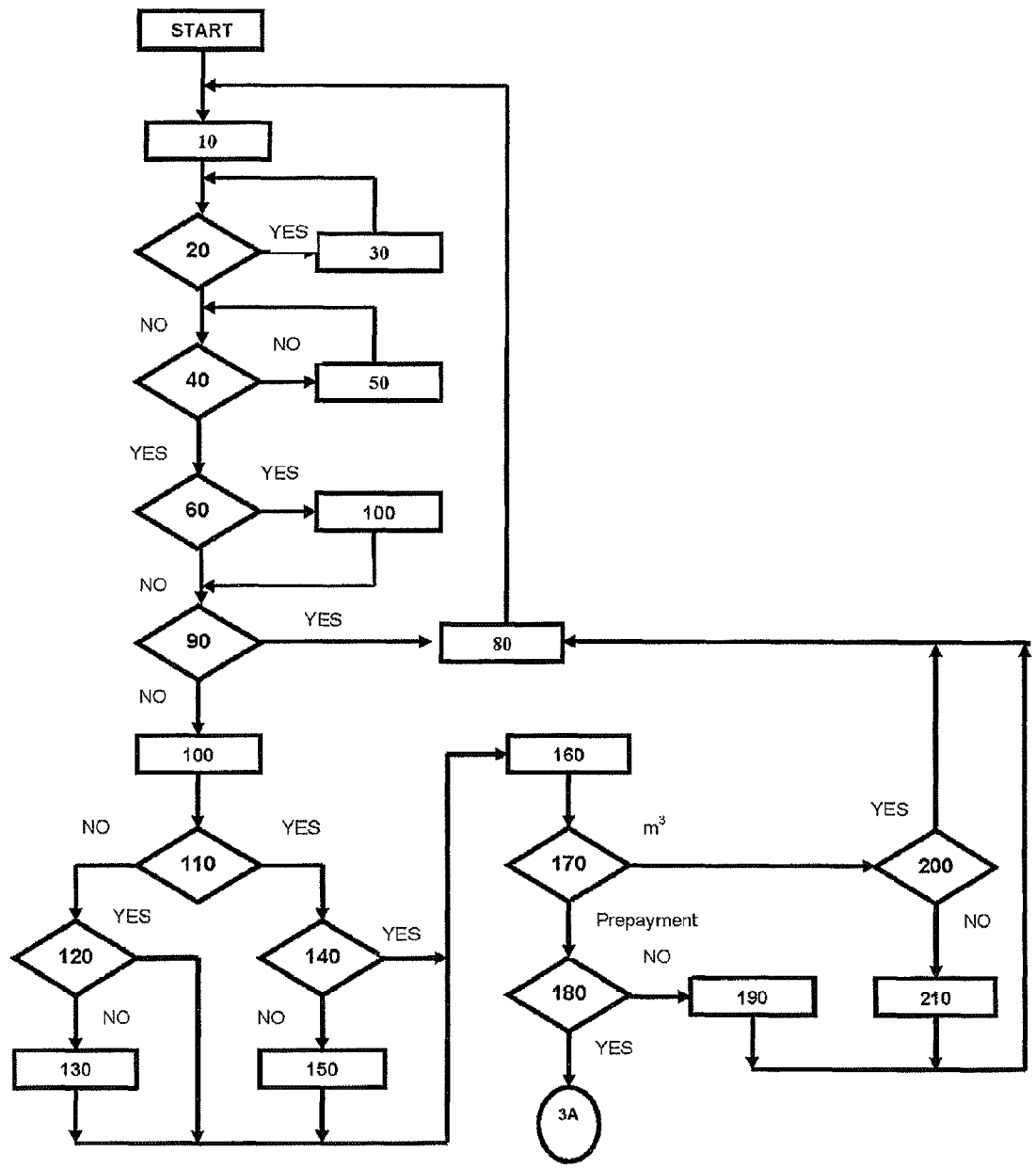
FIGS. 4 and 4A are flow diagrams useful to explain the operation of the prepayment system for measuring water or gas of FIGS. 1 and 2.
Figure 4A:
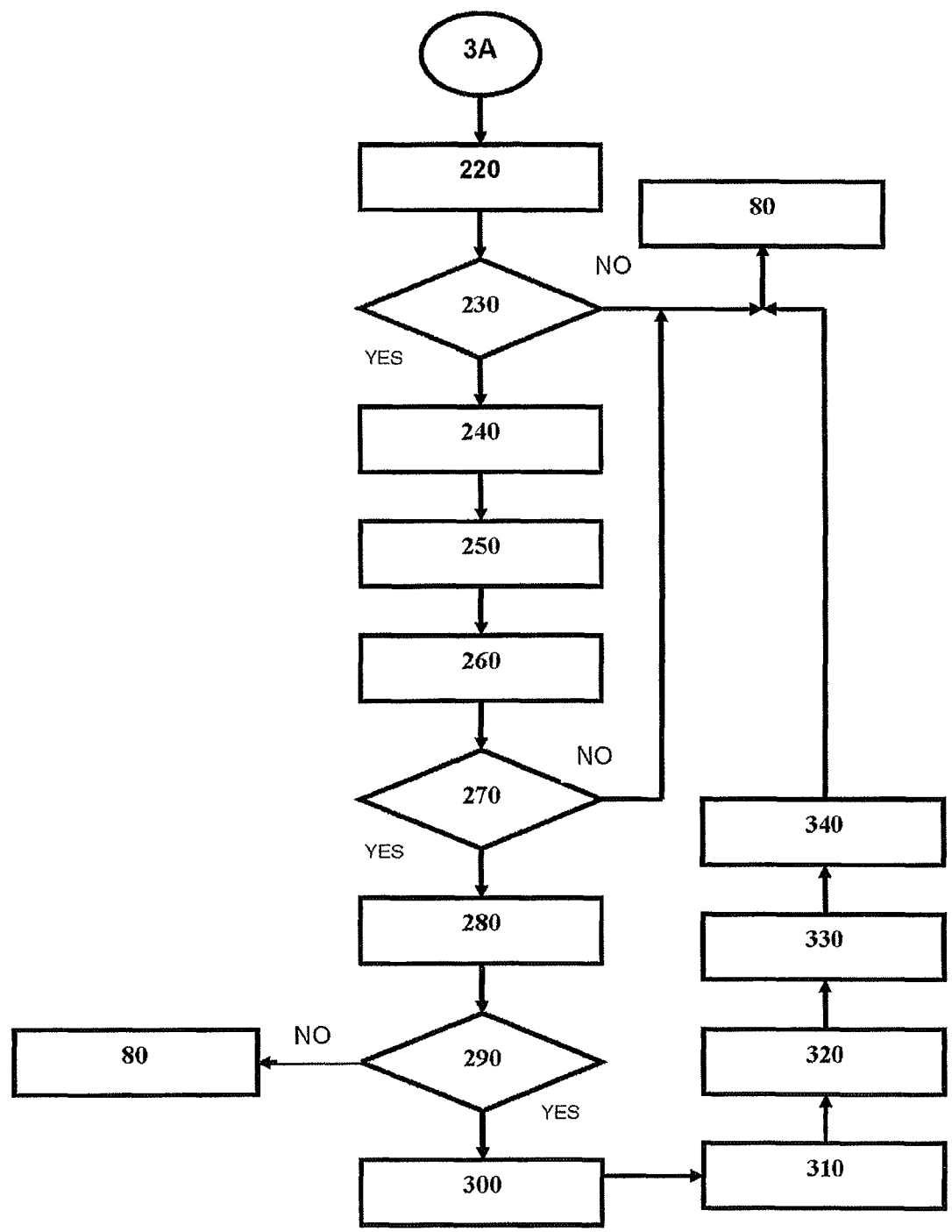

While operating, the prepayment water or gas administration system, by means of a wireless intelligent card of the present invention, receives the m$^3$ supply in its meter via the wireless electronic measuring prepayment control and water or gas supply cut device which carries out the task of detecting and validating a prepayment card as well as of monitoring the prepayment and water or gas supply system in accordance with the flow diagram in FIGS. 4 and 4A. In a particular manner, microcontroller 6 monitors the prepayment system of the present invention as well as the prepayment communication tasks between meter 18 and prepayment card 15.

Before beginning the communication and monitoring tasks, microcontroller 6 activates communication serial ports with which it will be in constant communication. Then, it will configure wireless intelligent card reader-writer element 7, e.g, ISO 14443-4A standard. Once the ports have been activated and wireless reader-writer element 7 has been configured, microcontroller 6 reads the stored data, such as client's serial number, water or gas m$^3$ stored during the lifespan of the meter (the meter serial number will be read only at this phase given the fact it never changes). After such data has been read, a timer in microcontroller 6 gets started in order for an interruption to be generated every 70 milliseconds and microcontroller 6 can carry out a specific task. Microcontroller 6 then goes through an inactive state, that is, it stops functioning at all and "goes into a standby state" in order to save the maximum amount of battery energy. Microcontroller 6 can only come out of the inactive state by interrupting the timer, which is done by means of button 12 (activity related to FIG. 3).

In this way, in the event the timer generates an interrupt signal (block 10), microcontroller 6 will review the upper and lower covers' sensors of the meter (block 20). If it is activated, microcontroller 6 will send a signal to the opening/closing water or gas supply mechanism 1 via supply-cut controller 5 (block 30) in order to close the valve. The supply will only be restored when the meter gets restarted (that is, when the alarm in the upper and lower covers' sensors gets deactivated).

On the specific embodiment for a water meter, microcontroller 6 also verifies the state of water sensor 10 (block 40). If no water flow is detected, the microcontroller will send a signal to open a relief valve 11 so the air trapped in the water pipes is released (block 50), and microcontroller 6 verifies if there are specific opening/closing instructions under schedule (block 60). In case of being affirmative, this information will be recorded in its flash memory (100).

On the specific embodiment for a gas meter, microcontroller 6 will not perform blocks 40, 50 and 60.

Then microcontroller 6 reads the balance in the meter, the water or gas m$^3$ accumulated, by means of sensor element 2 (block 90), regardless of the water or gas flow direction because sensor element 2 detects the magnet polarities irrespective of the direction the water or gas flows, being the measurement bidirectional. Microcontroller 6 then waits for an interrupt signal (block 80) given after detecting the presence of wireless card 15 or by activating download button 12.

Once microcontroller 6 has read the data stored in its Flash memory (block 100), it verifies and changes the valve state of water or gas supply opening/closing mechanism 1 with respect to the user's prepaid balance. Based on the information obtained in (block 100), microcontroller 6 verifies that the prepaid supply balance is greater than 0 (block 110). In the event such balance is not greater than 0, the microcontroller checks if the water or gas supply opening/closing mechanism valve 1 is closed (block 120). If after verifying the state of valve 1 (block 120) the outcome is negative, microcontroller 6 sends a signal to controller 5 which closes water or gas supply opening/closing mechanism valve 1 (block 130) in order to stop the water or gas supply to meter 18. After closing valve 1 in (block 130), microcontroller 6 reads the information displayed on the screen of meter 18 (block 160). However, if the outcome determined in block 120 is satisfactory, i.e., valve 1 is closed, microcontroller 6 reads the information displayed on the screen of meter (block 160).

On the other hand, if the balance read in (block 110) is greater than zero, microcontroller 6 verifies that valve 1 is open (block 140). If after verifying valve 1 (block 140) the outcome is negative, microcontroller 6 sends a signal to controller 5 which performs the task of opening valve 1 (block 150) in order to allow the water or gas supply to user 9. After opening valve 1 in (block 150), microcontroller 6 reads the information displayed on the screen of meter 18 (block 160). However, if the outcome determined in (block 140) is affirmative, i.e., valve 1 is open, microcontroller 6 reads the information displayed on the screen of meter (block 160).

After verifying the state of water or gas opening/closing mechanism's valve 1 as described in (Blocks 110 to 160), microcontroller 6 reviews that the screen is shown on the meter (Block 170). If the screen shown in (Block 170) is the "Prepaid" one, then microcontroller 6 verifies that the radio frequency generator (Block 180) of the wireless reader-writer of wireless intelligent card 7 is switched on in order to start the search for a prepaid card. If the determination in (Block 180) is negative, then no signal to switch on the radio frequency (Block 190) will be generated and microcontroller 6 will return to an inactive state in order to save the maximum amount of energy possible from battery 8 while waiting for an interrupt signal (Block 80) and the routine as described in Blocks (10 a 180) is resumed. In the event of an affirmative outcome (Block 180), meaning that the radio frequency is switched on, then a radio signal will be emitted through antenna 14 in order to detect the presence of a wireless intelligent card 15 in the vicinity (Block 220).

When the screen shown in (Block 170) corresponds to "$m^3$", microcontroller 6 verifies the state of the wireless reader-writer element (Block 200); in the event of the wireless reader-writer element being switched off, microcontroller 6 will return to an inactive state in order to save the maximum amount of energy possible while waiting for an interrupt signal (Block 80) and the routine as described in Blocks (10 a 180) is resumed. If the result of verifying the state of the wireless reader-writer element is negative, meaning that the wireless reader-writer element is switched on, then microcontroller 6 switches off or deactivates the wireless reader-writer element (Block 210) and then microcontroller 6 will return to an inactive state in order to save the maximum amount of energy possible from battery 8 while waiting for an interrupt signal (Block 80) and the routine as described in Blocks (10 a 180) is resumed.

Microcontroller 6 then carries out the functions of reading the stored data, verifying and changing the state of valve 1, and reviews that the screen is shown on the meter to activate/deactivate the wireless reader-writer element, it then will proceed to detect the presence of a wireless prepayment intelligent card 15 and carry out the prepayment download transaction.

As previously mentioned, when the microcontroller confirms that the wireless reader-writer element is switched on, the wireless reader-writer element will emit a radio frequency through antenna 14 thereby executing a search function for cards 15 (Block 220) in accordance to ISO 14443-3A standard. After the search function for a card from (Block 220) has been performed, the wireless reader-writer element 6 verifies if there is an intelligent card 15 within the field of detection (Block 230). If an intelligent card is present within the field of detection in Block 230, an anti-collision protocol (Block 240) is carried out in order to determine if there is more than one intelligent card within the detection field (in the event that there is more than one intelligent card 15, one will be deactivated according to ISO 14443-3A standard). If there is no intelligent card 15 within the detection field in said Block 230, the wireless reader-writer element 6 will return to an inactive state in order to save the maximum amount of energy possible from battery 8 while waiting for an interrupt signal (Block 80) and the routine as described in Blocks (10 a 180) is resumed.

Once a card is detected within the field, the system selects the card (Block 250) according to radio frequency data transmission protocol (for instance, that specified in the ISO 14443-3A standard, and including that specified in the ISO 14443-4A standard). After selecting the card in (Block 250), the wireless reader-writer element 7 authenticates the card with the digital signature for the amount of prepaid $m^3$ of water or gas and with the meter's serial number (Block 260). Microcontroller 6 then verifies if the intelligent card corresponds to the meter (Block 270), if the card does not correspond to this meter, wireless reader-writer element 7 will return to an inactive state in order to save the maximum amount of energy possible from battery 8 while waiting for an interrupt signal (Block 80) and the routine as described in Blocks (10 a 18) is resumed. However, if the card does correspond to this meter, it will then read the balance on the card (Block 280). At this point, microcontroller 6 verifies if the prepaid intelligent card has credit (Block 290), if the outcome in (Block 290) is negative then microcontroller 6 will return to an inactive state in order to save the maximum amount of energy possible from battery 8 while waiting for an interrupt signal (Block 80) and the routine as described in Blocks (30 a 180) is resumed. If the result of (Block 290) is affirmative, then the microcontroller will enable the balance of intelligent card 15 to be downloaded into the Flash memory of microcontroller 6 (Block 300). It is possible that not all of the prepaid balance is downloaded at one time, given that the balance to be downloaded depends on the amount recorded on the card in the "Amount in $m^3$ of prepaid water or gas to be transferred by download" variable. After downloading the balance in (Block 300), the system reads the remaining balance on the meter (Block 310) and adds the balance downloaded from card 15 to the remaining balance on the meter (Block 320). The new prepaid balance resulting from the operation carried out in (Block 320) is sent to the water or gas meter's Flash memory (Block 330) by means of microcontroller 6. After receiving the new balance, or at the same time, microcontroller 6 sends the information generated concerning the water or gas consumed by the user during the lifespan of the meter and any unlawful use of the meter to intelligent card 15 (Block 340). After having sent the information to intelligent card 15, microcontroller 6 will return to an inactive state in order to save the maximum amount of energy possible from battery 8 while waiting for an interrupt signal (Block 80) and the routine as described in Blocks (10 a 180) is resumed.

Although specific operations of this invention have been described and illustrated, it is obvious for those persons with knowledge of this area that other changes and modifications will have to be made without changing the spirit or the scope of the invention. As such, the attached claims will be protected from any change or modification which is within the scope of this invention.

The invention claimed is:

1. A prepayment method for supplying water using i) a wireless intelligent card loaded with a prepaid amount of service, ii) a water meter which comprises upper and lower protective covers, a wireless reader-writer element of wireless intelligent cards, a measuring chamber for measuring bidirectional consumption of water are composed of a nutating disc enclosed by said upper and lower covers to keep the nutating disc in position and thus ensure its correct measuring movement, and a water supply opening/closing mechanism, and iii) a network which includes at least one point of sale terminal with a pair of safety modules, a server connected via an interface to a billing system which keeps a service supplier's database informed, the method comprising the steps of:
    verifying the status of the water supply meter's opening/closing mechanism in order to determine if it is open or closed;
    detecting the state of sensors on the upper and lower protective covers of the meter to determine if the meter has been tampered with;
    emitting a radio frequency signal from the meter to create a detection field;
    determining if there is more than one prepayment wireless intelligent card within the detection field of the water meter;
    selecting the prepayment wireless intelligent card in accordance with a previously determined radio frequency data transmission protocol;
    exchanging information between the meter and the prepayment wireless intelligent card through radio frequency;
    authenticating the prepayment wireless intelligent card and the wireless reader-writer of prepayment wireless intelligent cards, and simultaneously, by means of two or more digital signatures and the meter's serial number, determining if the prepayment wireless intelligent card has a $m^3$ prepaid balance which is above zero;
    downloading the amount of prepaid $m^3$ from the prepayment wireless intelligent card and storing it in the meter's memory;
    uploading information to the prepayment wireless intelligent card and recording it in the memory of said prepayment wireless intelligent card, wherein the information generated is in relation to the water that has been consumed since installation of the meter and any unlawful act or manipulation of the meter; and
    electronically registering the water consumption, wherein the method comprises the additional steps of:
    determining whether there is information about water supply at a predetermined time, predetermined $m^3$ amount or both;
    detecting water flow via the meter; and
    in the event of not detecting any water flow, sending a signal to open a relief valve in order to release any air contained in the water pipes.

2. A meter to register the bidirectional consumption of water or gas which comprises:
    a meter's main body which includes an entrance hole and an exit hole;
    a measuring chamber within the meter's main body;
    a supply and closing chamber within the meter's main body and in fluid communication with the measuring chamber;
    a water or gas supply/cut valve within the supply and closing chamber;
    a pair of upper and lower protective covers located on the main body of the meter, and
    a liquid crystal display located in the upper protective cover,
    a wireless electronic measuring, prepayment and gas or water supply cut device located within the upper protective cover of the meter's body,
    wherein the measuring chamber includes means with which to register the bidirectional consumption of water or gas, where the means to register the bidirectional consumption of water or gas are composed of a nutating disc and upper and lower covers which enclose the nutating disc to keep it in position and thus ensure its correct measuring movement, a rod said rod having a first end located in the center of and extending upwards toward the nutating disc through the upper cover which encloses the nutating disc, and a second end comprising a magnetic element,
    a first sensor element located on an adjacent external surface of the measuring chamber of the meter's main body and within the upper protective cover, where the first sensor element registers rotations of the magnetic element transmitted by the nutating disc in order to then calculate the volume of gas or water circulating within the measuring chamber, where the first sensor element is capable of recording the consumption of water or gas regardless of the flow direction;
    a converting device attached to the first sensor element to convert the magnetic signal produced by rotations of the magnetic element into a digital signal, where the converting device is also electrically connected to the wireless electronic measuring, prepayment control and water or gas supply cut device, where the wireless electronic measuring, prepayment control and water or gas supply cut device receives the digital signal and then transmits it to the liquid crystal display for its subsequent visualization;
    a closing mechanism which includes a gear train, a sliding disc and a fixed disc which can open or close the water or gas supply, where the opening or closing of the gear train is operated by an engine, which is controlled by the wireless electronic measuring, prepayment and water or gas supply cut device which is electrically connected to said engine;
    a printed circuit board antenna to communicate information via radio frequency between a wireless intelligent card and the wireless electronic measuring, prepayment and water or gas supply cut device;
    a battery located above the supply and closing chamber, which provides energy to the wireless electronic measuring, prepayment and water or gas supply cut device to register the bidirectional consumption of water or gas, to the engine which powers the closing mechanism and to the liquid crystal display; and
    a third sensor to detect the flow of water in a line supplying water to the meter and a relief valve, wherein the third sensor is connected to the wireless electronic measuring, prepayment and supply cut device in order to receive a signal from the sensor which detects water flow, in the event of not detecting any water flow, the wireless electronic measuring, prepayment and supply cut device will send a signal to open the relief valve in order to release any air contained within the pipes and which could circulate via the meter and be registered as consumption.

3. The meter as set forth in claim 2, wherein the upper and lower protective covers are each comprised of a second sensor element to register the opening of either of the upper or lower covers, where in the event that at least one of the upper or lower covers has been unhooked from the meter's main body, the meter will automatically cut off the service until a technician from the company re-establishes it.

4. The meter as set forth in claim 2, wherein the water circulating through the entrance hole of the meter's main body enters the measuring chamber causing the nutating disc to spin and thus transmit its rotating movement to the magnetic element via the rod, where the first sensor element detects the number of spins of the magnetic element.

5. The meter as set forth in claim 2, wherein the closing mechanism also includes a pair of second sensors to detect the position of the sliding disc, open or closed, where the sensors are connected to and send the position signal from the sliding disc to the wireless electronic measuring, prepayment and water or gas supply cut device.

6. The meter as set forth in claim 2, further comprising a button to activate a wireless reader-writer element to start information download from the prepayment wireless intelligent card about a prepaid amount of water or gas.

\* \* \* \* \*